United States Patent
Dohle et al.

(10) Patent No.: US 7,386,359 B2
(45) Date of Patent: Jun. 10, 2008

(54) DEVICE AND METHOD FOR TESTING MACHINE TOOLS AND PRODUCTION MACHINES

(75) Inventors: Stefan Dohle, Baiersdorf (DE); Thomas Menzel, Erlangen (DE)

(73) Assignee: Siemens Akteingesellschaft, München (DE)

( * ) Notice: Subject to any disclaimer, the term of this patent is extended or adjusted under 35 U.S.C. 154(b) by 507 days.

(21) Appl. No.: 10/935,543

(22) Filed: Sep. 7, 2004

(65) Prior Publication Data
US 2005/0065746 A1 Mar. 24, 2005

(30) Foreign Application Priority Data
Sep. 8, 2003 (DE) ................... 103 41 325

(51) Int. Cl.
*G01M 15/00* (2006.01)
*G06F 19/00* (2006.01)
(52) U.S. Cl. ............. 700/104; 702/113; 702/233; 700/94; 700/117
(58) Field of Classification Search ........... 700/96, 700/104, 117; 712/233; 703/6; 702/113
See application file for complete search history.

(56) References Cited

U.S. PATENT DOCUMENTS

| 4,385,349 | A | * | 5/1983 | Ashford et al. | ............... 700/79 |
|---|---|---|---|---|---|
| 4,833,617 | A | * | 5/1989 | Wang | ............... 700/173 |
| 5,752,008 | A | * | 5/1998 | Bowling | ............... 703/13 |
| 5,991,528 | A | * | 11/1999 | Taylor et al. | ............... 703/6 |
| 6,477,639 | B1 | * | 11/2002 | Krishnan et al. | ............... 712/237 |
| 2003/0014149 | A1 | * | 1/2003 | Kreidler et al. | ............... 700/169 |

FOREIGN PATENT DOCUMENTS

| DE | 200 22 944 U1 | 9/2002 |
|---|---|---|
| DE | 101 34 940 A1 | 2/2003 |
| JP | 06231111 A | 8/1994 |

OTHER PUBLICATIONS

"BASIC", Wikopedia online encyclopedia definition.*

* cited by examiner

*Primary Examiner*—Michael D. Masinick
(74) *Attorney, Agent, or Firm*—Henry M. Feiereisen; Ursula B. Day

(57) ABSTRACT

A test device and a test method for testing a machine tool or production machine are disclosed. A control and monitoring unit processes at least one predefined instruction sequence and generates control commands for operating the machine controller in order to test the machine. The control commands are transmitted to the machine controller, where they are executed. The instruction sequence also includes control instructions. This results in a relatively simple test device and method for automatically and reproducibly testing a machine tool or production machine.

18 Claims, 3 Drawing Sheets

DEVICE AND METHOD FOR TESTING MACHINE TOOLS AND PRODUCTION MACHINES

CROSS-REFERENCES TO RELATED APPLICATIONS

This application claims the priority of German Patent Application, Serial No. 103 41 325.1, filed Sep. 8, 2003, pursuant to 35 U.S.C. 119(a)-(d), the disclosure of which is incorporated herein by reference.

BACKGROUND OF THE INVENTION

The present invention relates to a device for testing machine tools and production machines, whereby a machine controller is connected to a simulation system that simulates the characteristic of the machine for exchange of process data therebetween. The present invention is also directed to a method for testing machine tools and production machines, wherein process data are exchanged between a machine controller and a simulation system.

Nothing in the following discussion of the state of the art is to be construed as an admission of prior art.

The quality of system software and application software can be improved and control systems and applications for machine tools or production machines can be better parameterized by systematically executing and analyzing function tests and/or regression tests. To execute these tests for testing the system software and application software as well as for the parameterization, an operator manually operates the machine controller and monitors the response of the machine controller to the operation. Also, a simulation system connected to the controller can simulate and confirm the machine response to the performed operation.

FIG. 1 shows a block diagram of a conventional test device for testing machine tools or production machines. A machine controller 1, subsequently also referred to as controller 1, is connected via a bus link 3 with a simulation system 4 that is implemented on a computer 2 in form of software. The simulation system 4 is used to simulate the kinematics and/or logical (interaction between actuators and sensors) and/or the mechanical and/or the control characteristics. For example, desired values (e.g., the desired rotation speed) generated by the controller 1 and control signals are transmitted to the simulation system 4. The simulation system 4 determines based on a simulation the kinematics and/or logical (interaction between actuators and sensors) and/or the mechanical and/or the control characteristics of the machine. The actual values (e.g., the actual rotation speed) that include desired values and/or signals of the simulated sensor system and the operations are fed back to the controller 1 via the bus link 3. The quantities transmitted via the bus link 3 are referred to as process data. The term "process data" hereby includes not only the actual values, but also the desired values and control signals. The computer 2 is connected via a link 15 with an input/output (I/O) unit 16, which in an exemplary embodiment includes a display screen, a keyboard and a data carrier. The I/O unit 16 is used to operate the simulation system 4 and to control the process flow of the test and the generated data. The controller 1 includes an operator console 5 with a display screen 6 and a keypad 7.

The controller 1 of a conventional test device of this type is operated manually, i.e. the software is loaded manually into the controller 1, and the controller 1 is manually initialized, booted and reset by an operator. The execution of the application software or system software is also initiated by a manual operation. In addition, the tests are evaluated by having an operator observe the controller and the process signals generated by the simulation system 4, in order to verify the correct operation of the machine and to identify a faulty operation. In a simple test, the operator can manually pressing a key on a keypad 7, whereafter a symbol is displayed on the display 6. The symbol on the display disappears when the same key is pressed a second time. The time between the two key activations is not precisely defined for a manual operation. When the test is repeated, the time interval between the two operations can be shorter or longer, which can alter the test result. It is therefore more difficult to conduct comprehensive tests using this conventional manual approach, which also significantly limits the reproducibility of the test results.

It would therefore be desirable and advantageous to provide an improved device and an improved method for testing machine tools or production machines, which obviate prior art shortcomings and are able to automatically and reproducibly test a machine.

SUMMARY OF THE INVENTION

According to one aspect of the present invention, a device for testing a machine tool or production machine includes a simulation system that simulates a characteristic of the machine tool or production machine, a machine controller in communication with the simulation system for exchanging process data with the simulation system, and an automated control and monitoring unit in communication with the machine controller and the simulation system, wherein the control and monitoring unit controls the machine controller. The simulation system provides to the control and monitoring unit process signals that are processed and stored in the control and monitoring unit. The control and monitoring unit processes at least one predefined instruction sequence, and generates from the instruction sequence control commands for operating the machine controller, and transmits for testing the machine tool or production machine the control commands to the machine controller for execution by the machine controller. The instruction sequence further includes control instructions According to another aspect of the invention, a method for testing a machine tool or production machine includes exchanging process data between a machine controller and a simulation system, wherein the simulation system simulates a characteristic of the machine tool or production machine. The simulation system provides process signals to a control and monitoring unit that controls the machine controller, and the control and monitoring unit records and stores the process signals. The control and monitoring unit executes at least one predefined instruction sequence to generate control commands for operating the machine controller, and transmits—for testing the machine tool or production machine—the control commands to the machine controller for execution by the machine controller. The instruction sequence further includes control instructions.

The device and method of the invention may include one or more of the following features.

According to an advantageous embodiment of the invention, the instruction sequences can be programmed in a high-level language, since in a high-level language, control instructions can be readily incorporated in the instruction sequences.

Advantageously, the instruction sequences can be programmed in an interpretative high-level language.

According to another advantageous embodiment of the invention, the interpretative high-level language can include a Basic dialect. The Basic programming language and its variations represent standard interpretive high-level languages.

According to another advantageous embodiment, the high-level language can be expanded by incorporating macros, functions and classes for accessing data in the machine controller. Such extensions can provide an individual adaptation to the respective machine controller.

According to yet another advantageous embodiment of the invention, the machine controller can be implemented as a virtual controller simulated on a computer. By simulating the controller on a computer instead of implementing the controller as a physical device, different machines can be simulated and tested on a common computer and/or a simulation system.

Advantageously, the control and monitoring unit in the simulation system can be realized on a computer. This makes the configuration of the test device particularly compact and simple.

According to another advantageous embodiment, the process signals can be outputted as trace files. In this way, the recorded process signals can be analyzed at a future time.

According to yet another advantageous embodiment, the trace files can also include direct information about detected faults. By including control instructions in the instruction sequences written in a high-level language, faults can be identified, for example, by a simple interrogation of invalid states of the process signals, and direct information about the identified fault, such as "machine is running with door open," can be recorded within a trace file.

According to still another advantageous embodiment, the instruction sequences and/or the trace files can be sent between customers and manufacturers of the machine controller. In this way, tests conducted by the manufacturer can be readily reproduced at any time by the customer, and conversely, tests conducted by the customer can be easily repeated by the manufacturer.

According to another advantageous embodiment of the invention, the instruction sequences and/or the trace files can be sent via the Internet. Instruction sequences and/or trace files can be conveniently sent via the Internet by email.

According to yet another advantageous embodiment of the invention, the control instructions can include conditional branching and/or loops and/or value comparisons and/or timer functions and/or I/O functions.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
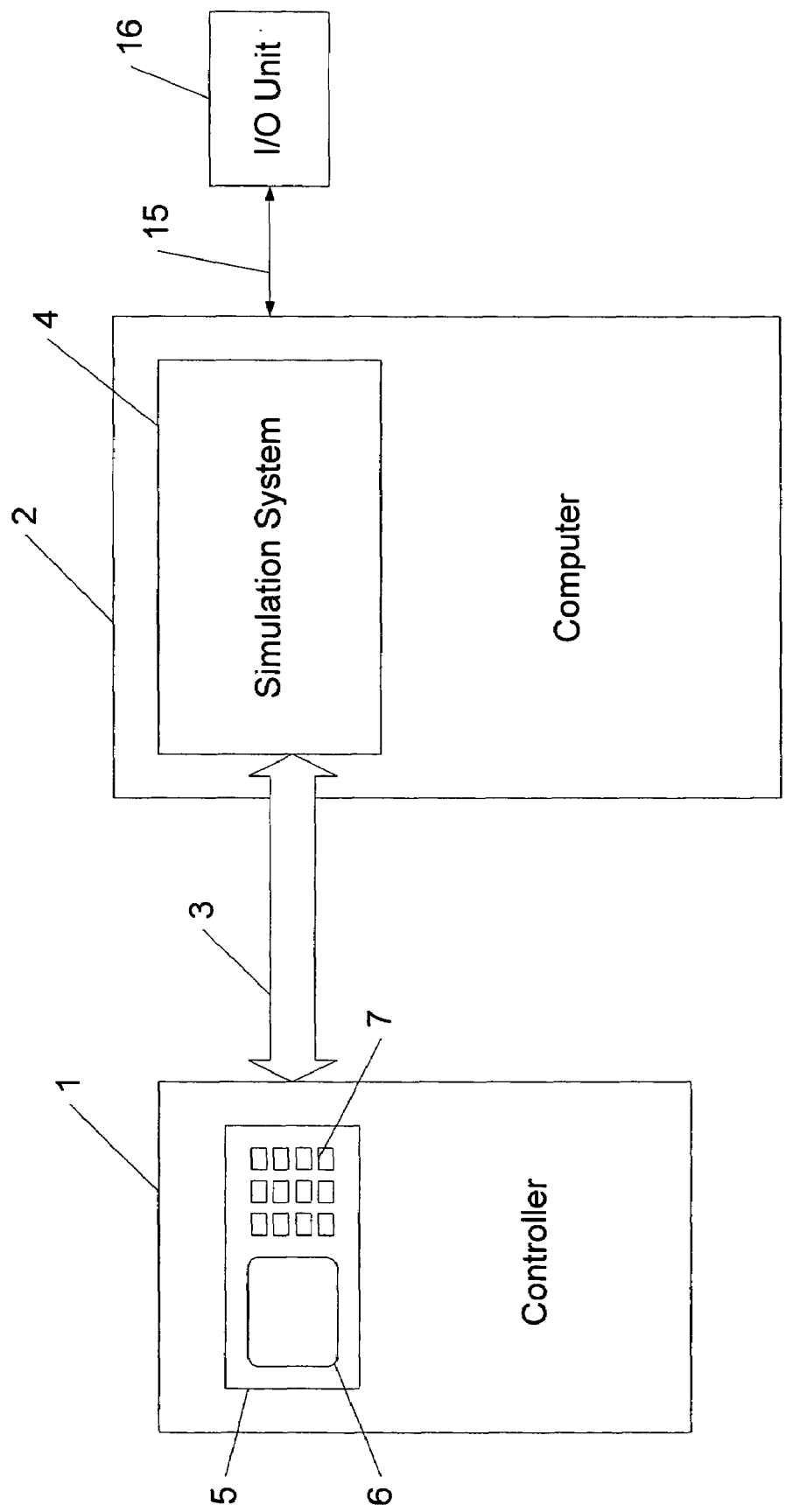
FIG. 1 shows a conventional device for testing a machine tool or production machine.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
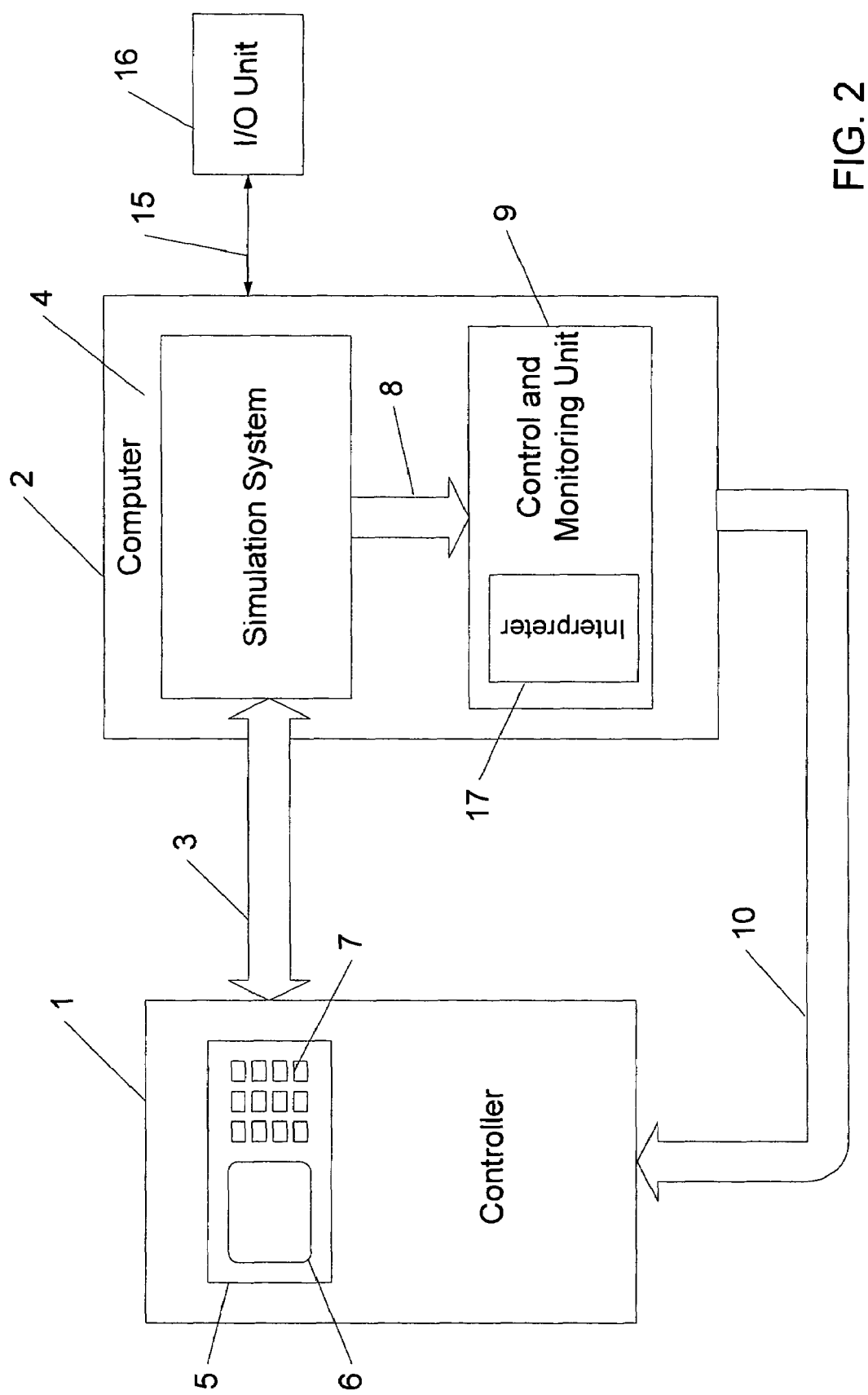
FIG. 2 shows a device for testing a machine tool or production machine according to the invention

Turning now to the drawing, and in particular to FIG. 2, there is shown an exemplary embodiment of the test device of the invention. The test device of the invention depicted in FIG. 2 includes a number of basic elements that are also found in the test device depicted in FIG. 1.

As shown in FIG. 2, a controller is connected via a bus link 3 with a simulation system 4 which is implemented in software on a computer 2. The simulation system 4 is used to simulate the kinematic and/or the logical (interaction between actuators and sensors) and/or the mechanical and/or the control characteristics of the machine. This is accomplished by, for example, transmitting from the controller 1 to the simulation system 4 desired values (e.g., desired rotation speed value) and control signals. The simulation system 4 then transmits based on a simulation and the kinematic and/or the logical (interaction between actuators and sensors) and/or the mechanical and/or the control characteristics of the machine. The actual values generated by the desired values and/or signals of a simulated sensor electronics or the performed operations are returned to the controller 1 via the bus link 3. The values transmitted via the bus link 3 are referred to as process data. Process data hereby include in addition to the desired values and actual values also, for example, control signals. The computer 2 is connected via link 15 with an input/output unit 16, which can include a display, a keyboard and a data carrier. The I/O unit 16 is used to operate the simulation system 4 and to control the process flow of the test and the generated data. The controller 1 includes an operator console 5 which has a display screen 6 and a keypad 7.

Unlike the conventional test device depicted in FIG. 1, the test device according to the invention depicted in FIG. 2 includes a control and monitoring unit 9. The simulation system 4 provides to the control and monitoring unit 9 via a link 8 process signals, which are recorded and stored in the control and monitoring unit 9. The process signals can hereby include, for example, actual values, desired values, control signals, parameters and the like. In addition, the control and monitoring unit 9 also processes user-defined control sequences, which in a simple case may include a sequence of separate control commands for operating the controller 1. The control commands are transmitted sequentially from the control and monitoring unit 9 via a bus link 10 to the controller 1. Such control command can be, for example, an automatic actuation of a key of the keypad 7, i.e., actuation of the key is automatically initialized by the control and monitoring unit 9 via the bus link 10 in response to a corresponding command and executed by the controller 1. By assembling a suitable instruction sequence, test runs of any complexity can be executed completely automatically by the test device according to the invention. The process signals generated by the simulation system 4 are stored in the control and monitoring unit 9 in the form of trace files.

The trace files and instruction sequences, which are provided in the form of files, can be transmitted via link 15 to the input/output unit 16, where they can be visualized, or can be stored on a data carrier.

Because the control and monitoring unit 9 can sequentially execute several predefined instruction sequences, different tests can be sequentially performed, whereby each test is defined by an instruction sequence associated with the test. A physical presence of an operator is therefore no longer required, and the operator is essentially replaced by the control and monitoring unit 9.

Figure 3:
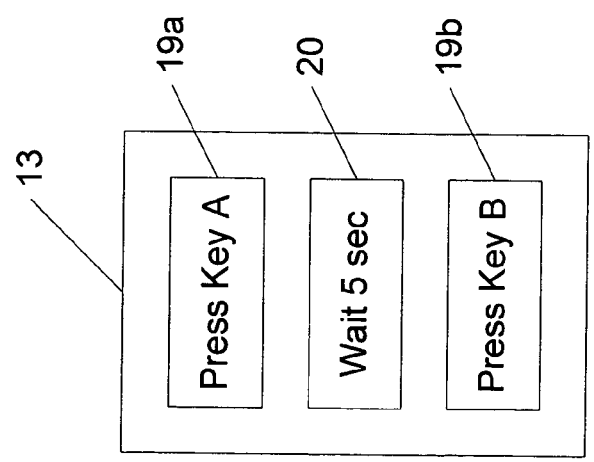
FIG. 3 shows an exemplary instruction sequence.

The instruction sequences can include control instructions, such as, for example, conditional branching and/or loops and/or value comparisons and/or timer functions and/or input/output functions. The instruction sequence is therefore not only configured as a sequence of control commands, which are transmitted to the controller 1, but includes additional control instructions, for example, conditional branching instructions, which can be in the form "If condition satisfied, then go to a predefined command." Depending on a signal state (which may even be a faulty state), the instruction sequence can be processed with a branching instruction, so that, for example, an error protocol can be generated if a fault occurs. In addition, a control instruction can also indicate a specified wait time before the next command is executed (timer function). Returning to the prior art example described above with reference to FIG. 1, where the wait time can depend on the operator input, with the embodiment of the invention, the time interval between repeated actuations of the keypad key is now precisely defined and can be exactly reproduced, so that a large number of tests can be repeated in an identical manner, both at the manufacturer site and at a customer site. In this way, the tests are always performed in an exact identical manner. The test conditions can then also be easily changed, if a time interval of, for example, seven seconds is desired between key activations instead of five seconds. FIG. 3 shows schematically an exemplary instruction sequence 13, which is composed of the two control commands 19a and 19b (press key A) and a timer instruction 20 (wait five seconds). This example is only given for illustrative purposes, and it will be understood that by changing the parameterization of the controller 1, comprehensive tests can be conducted, such as automatically initializing, booting and resetting the system software or application software. The effect of these operations on the machine or the machine response can always be controlled via the trace files.

Errors and impermissible states during testing can be identified automatically by using control instructions within the instruction sequence, and direct information about the identified faults can be included in the trace files. For example, the control instructions can be used to query states of the process signals and to recognize impermissible states, such as a machine running with an open machine door. Direct information about the identified fault, for example, "Machine operates with an open door" can then be written to the trace file.

The trace file can also record, for example, signal states, operator actions, events, results and deviations.

Advantageously, the instruction sequences can be programmed in a high-level language, because in a high-level language, control instructions can be readily processed by processing the instruction sequence.

Advantageously, the high-level language can be an interpretive high-level language, for example a high-level language executed on an interpreter, so that the instruction sequences are also programmed and executed in the interpretive high-level language. For this purpose, an interpreter 17 can be integrated in the control and monitoring unit 9. With the exemplary interpreter 17 shown in FIG. 2, the instructions and/or instruction sequences can be directly inputted and executed, without requiring advance compilation of the source code for the instructions and/or the corresponding instruction sequences. An exemplary high-level language can include, for example, Basic dialects which are easy to comprehend and which form a standard among the interpretive high-level languages.

Advantageously, the high-level language can also be extended to include macros, functions and classes for accessing data in the controller. With these extensions, the process can be specifically adapted to the respective machine controller.

In the exemplary embodiment depicted in FIG. 2, the simulation system 4 and the control and monitoring unit 9 are implemented cost-effectively in a computer 2. It will be understood, however, that the simulation system 4 and the control and monitoring unit 9 can also be implemented on more than one computer.

Moreover, the controller 1 need not be implemented in form of a physical controller, as shown in the exemplary embodiment of FIG. 2, but can also be simulated on the computer 2 or on another computer as a so-called virtual controller. In this way, different machines that can often have different controllers can advantageously be easily, flexibly and quickly tested.

Figure 4:
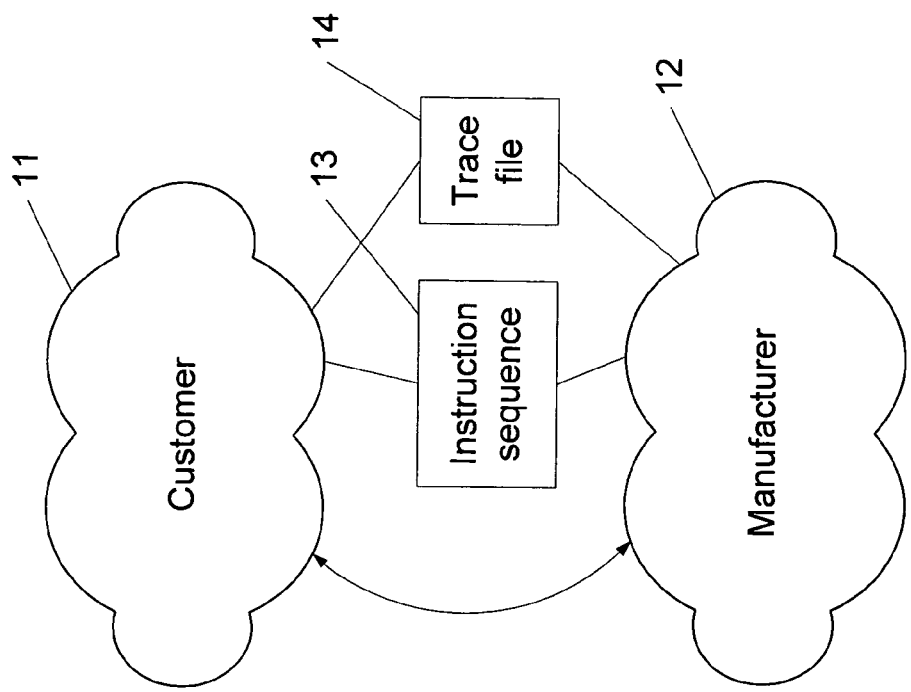
FIG. 4 shows schematically an exchange of instruction sequences and trace files between a customer and a manufacturer.

Referring now to FIG. 4, the instruction sequences 13, which are provided in the form of files, and/or the trace files 14 can be transmitted back and forth between a customer 11 and a manufacturer 12. Because the customer 11 has a test device that is similar or identical to that of the manufacturer 12, the tests of the machine tool or production machine can be performed so as to be identical, verifiable and reproducible for both the customer 11 and the manufacturer 12, which enables a meaningful comparison between the test results. For example, instruction sequences 13, i.e., test cases, can be designed by the customer 11 and tested at the customer site. If problems occur, the instruction sequences 13 can then be provided to the manufacturer 12 together with the associated trace files to conduct additional test for correcting and eliminating faults.

The test device according to the invention therefore makes, it possible to conduct repeated tests under reproducible conditions. Moreover, with the device and method of the invention, a large number of optionally different tests can be performed with only minimal manual intervention. Tests can also be exchanged, for example between a manufacturer and a customer, for documentation purposes. With the test device according to the invention, the quality of system software and application software can be significantly improved and more suitable parameters for the control of machine tools or production machines can be set, and fault conditions can be reliably detected.

It should be noted that in the context of the present invention, the manufacturer can be the manufacturer of the controller and the customer can be the manufacturer of the machine. Alternatively, the manufacturer can be the manufacturer of machine and the customer can be the end-customer, who uses the machine for production purposes, or the manufacturer can be the manufacturer of controller and the customer can be the end-customer.

Machine tools in the context of the present invention can also include, for example, uniaxial or multi-axis lathes, milling machines, as well as drilling or grinding machines. Machine tools can further include processing centers, linear and rotary transfer machines, laser machines, rolling machines and/or gear cutters. These machines have in common that the material is machined along several axes. Production machines in the context of the present invention can include textile, paper, plastic, wood, glass, ceramic or stone processing machines, as well as machines used for forming, packaging, printing, conveying, lifting, pumping, transporting. Furthermore, fans, blowers, wind turbines, lifting gear, cranes, robots, production and assembly lines are also included under the term production machines in the context of the present invention.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A test device for testing a machine tool or production machine comprising:
   a simulation system that simulates a characteristic of the machine tool or production machine;
   a machine controller in communication with the simulation system for exchanging process data with the simulation system;
   an automated control and monitoring unit in communication with the machine controller and the simulation system, said
   simulation system implemented on a computer and providing to the control and monitoring unit process signals that are processed and stored in the control and monitoring unit, and
   an interpreter integrated in the control and monitoring unit, wherein the interpreter directly executes at least one predefined instruction sequence programmed in an interpretative high-level language, without requiring advance compilation,
   wherein the control and monitoring unit processes the at least one predefined instruction sequence, generates from the instruction sequence control commands for operating the machine controller, and transmits the control commands for testing the machine tool or production machine to the machine controller for execution by the machine controller, said at least one instruction sequence further including control instructions.

2. The test device of claim 1, wherein the interpretative high-level language comprises a basic dialect.

3. The test device of claim 1, wherein the interpretative high-level language is expanded by incorporating macros, functions and classes for accessing data in the machine controller.

4. The test device of claim 1, wherein the machine controller is implemented as a virtual controller that is simulated on a computer.

5. The test device of claim 1, wherein the control and monitoring unit is implemented on a computer.

6. The test device of claim 1, wherein the process signals are outputted as trace files.

7. The test device of claim 6, wherein the trace files include direct information about detected faults.

8. The test device of claim 6, wherein the instruction sequences or the trace files, or both, are exchanged between customers and manufacturers of the machine controller.

9. The test device of claim 8, wherein the instruction sequences or the trace files, or both, are sent via the Internet.

10. The test device of claim 1, wherein the control instructions comprise commands selected from the group consisting of conditional branches, loops, value comparisons, timer functions and input/output functions.

11. A test method for testing a machine tool or production machine, comprising the steps of:
    exchanging process data between a machine controller and a simulation system, said simulation system simulating a characteristic of the machine tool or production machine;
    providing process signals from the simulation system to a control and monitoring unit that controls the machine controller,
    recording and storing the process signals in the control and monitoring unit,
    directly executing with an interpreter integrated in the control and monitoring unit at least one predefined instruction sequence programmed in an interpretative high-level language, without requiring advance compilation,
    processing the at least one predefined instruction sequence in the control and monitoring unit and generating from the instruction sequence to control commands for operating the machine controller, and
    transmitting the control commands for testing the machine tool or production machine from the control and monitoring unit to the machine controller for execution by the machine controller, said at least one predefined instruction sequence further including control instructions.

12. The test method of claim 11, wherein the interpretative high-level language comprises a basic dialect.

13. The test method of claim 11, wherein the high-level language is expanded by incorporating macros, functions and classes for accessing data in the machine controller.

14. The test method of claim 11, wherein the process signals are outputted as trace files.

15. The test method of claim 14, wherein the trace files include direct information about detected faults.

16. The test method of claim 14, wherein the instruction sequences or the trace files, or both, are exchanged between customers and manufacturers of the machine controller.

17. The test method of claim 16, wherein the instruction sequences or the trace files, or both, are sent via the Internet.

18. The test method of claim 11, wherein the control instructions comprise commands selected from the group consisting of conditional branches, loops, value comparisons, timer functions and input/output functions.

* * * * *

UNITED STATES PATENT AND TRADEMARK OFFICE
CERTIFICATE OF CORRECTION

PATENT NO. : 7,386,359 B2  Page 1 of 1
APPLICATION NO. : 10/935543
DATED : June 10, 2008
INVENTOR(S) : Stefan Dohle & Tmoas Menzel It is certified that error appears in the above-identified patent and that said Letters Patent is hereby corrected as shown below:

Title page, item [73] Assignee: replace "Siemens Akteingesellschaft" with

--Siemens Aktiengesellschaft--.

Column 8, line 35: delete "to" before --control--.

Signed and Sealed this

Second Day of September, 2008

JON W. DUDAS
*Director of the United States Patent and Trademark Office*